R. WEINREICH.
POST DIGGER ATTACHMENT.
APPLICATION FILED JULY 27, 1911.
1,010,548.
Patented Dec. 5, 1911.
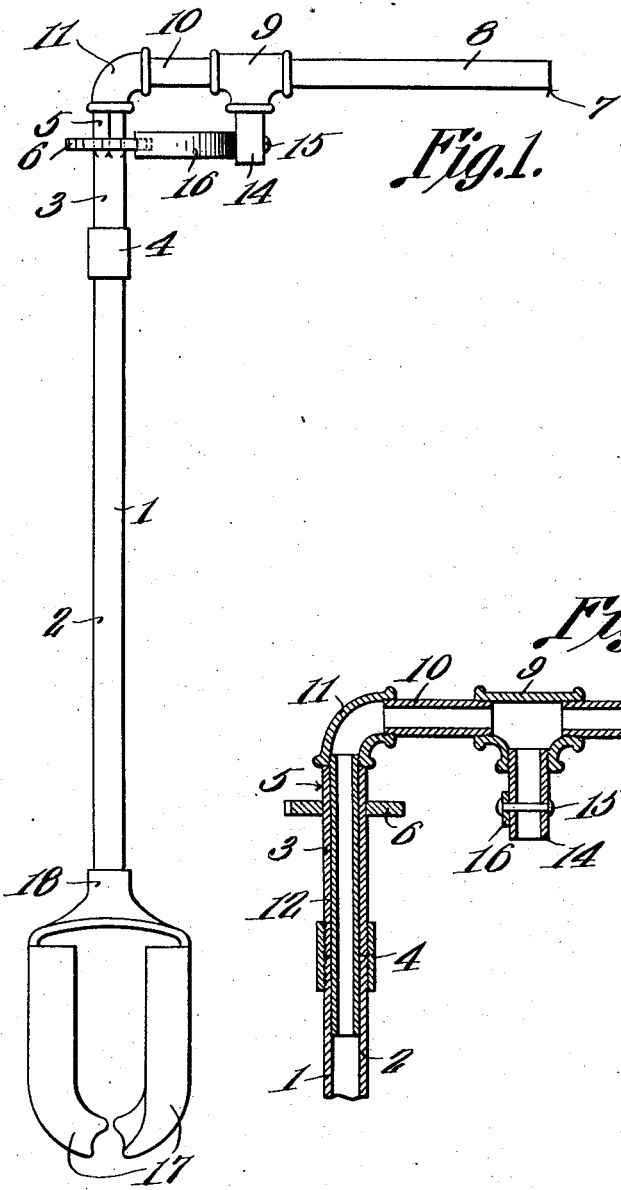
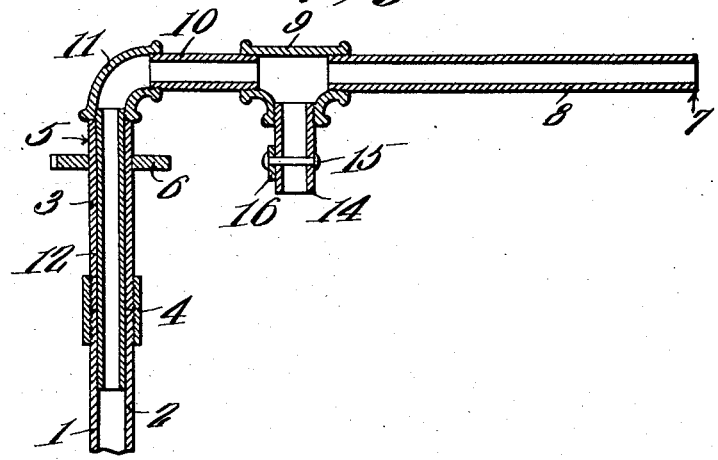
Richard Weinreich,
Inventor

UNITED STATES PATENT OFFICE.

RICHARD WEINREICH, OF BURNSIDE, ILLINOIS.

POST-DIGGER ATTACHMENT.

1,010,548.     Specification of Letters Patent.     Patented Dec. 5, 1911.

Application filed July 27, 1911. Serial No. 640,815.

*To all whom it may concern:*

Be it known that I, RICHARD WEINREICH, a citizen of the United States, residing at Burnside, in the county of Hancock and State of Illinois, have invented a new and useful Post-Digger Attachment, of which the following is a specification.

The present invention aims to provide a means whereby a post hole auger may be rotated in a fence corner, in the angles of buildings, and elsewhere, in which locations the auger could not well be rotated through the instrumentality of the common, T-shaped handle which is usually supplied with a post hole auger.

A further object of the invention is to provide a supplemental handle for a post hole auger, the handle consisting of a stock and of a lever member, of novel and improved construction, the entire device being so constituted that it may be fashioned at trifling expense, from common materials of construction.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in side elevation; and Fig. 2 is a fragmental vertical section.

The device herein disclosed consists of a stock 1 which is a composite structure. The stock 1 consists of a main part 2, preferably a length of pipe, and a supplemental part 3, likewise a length of pipe, the parts 2 and 3 being united by a coupling 4, into which the parts 2 and 3 are threaded. The upper end of the supplemental part 3 of the stock 1 is squared, as denoted by the numeral 5, and upon this squared end 5 of the supplemental member of the stock, is removably seated, against rotation, a ratchet wheel 6.

The invention further includes a lever member, denoted generally by the numeral 7. The lever member 7, in its turn, is a composite structure, and comprises a body portion 8, preferably a length of pipe. One end of the body portion 8 is threaded into one branch of the T coupling 9. The auxiliary part 10 of the lever is threaded into the opposite branch of the T 9, in alinement with the part 8. To the end of the auxiliary part 8, an elbow 11 is secured by threading or otherwise, the depending branch of the elbow 11 being threaded to receive a shaft 12, which, like the parts 10 and 8, is preferably a length of pipe. The axis of the shaft 12 is at right angles to the axis of the parts 10 and 8, the shaft 12 registering for rotation in the supplemental member 3 of the stock.

The depending branch of the T 9 carries a short arm 14, which is preferably a pipe, threaded into the T. Through the arm 14 is passed a bolt 15 or other securing element, carrying a spring pawl 16, adapted to engage with the ratchet wheel 6. The lower end of the elbow 11 rests upon the upper end of the supplemental portion 3 of the stock and the pawl 16 is maintained in operative relation with respect to the ratchet wheel 6. The pawl 16 is preferably a stiff spring member, sufficiently yieldable to click over the teeth of the ratchet wheel 6, and sufficiently stiff to secure a rotation of the ratchet wheel 6 and the stock 1 with which the ratchet wheel is assembled.

In practical operation, when it is desired to use a post hole auger in a restricted area, where the common, T-shaped handle cannot be employed, the handle which is supplied with the post hole auger, is unscrewed from the socket 18 which connects the blades 17 of the post hole auger, the lower end of the main part 2 of the stock 1 being threaded into the socket 18, to replace the handle which is supplied with the auger.

It will be seen that when the lever 7 is reciprocated through a relatively small angle, the pawl 16 will engage the ratchet 6, and rotate the stock 1 and the auger which is assembled with the lower end of the stock.

The elbow 11, in addition to its function as a connecting means between the parts 10 and 12, serves, also through its engagement with the upper end of the supplemental part 3 of the stock, to position the pawl 16 and the ratchet 6 opposite to each other.

The construction of the device is such that it may be easily knocked down, the shaft 12 being readily removable from the supplemental part 3 of the stock.

Having thus described the invention, what is claimed is:—

1. A supplemental handle for a post hole auger, comprising a stock; a lever member comprising angularly disposed parts, one of which is rotatable within the stock; a ratchet wheel secured to the stock; and a pawl secured to the lever, and adapted to coöperate with the ratchet wheel.

2. A supplemental handle for a post hole auger, comprising a stock having a polygonal upper end; a ratchet wheel removably seated upon the polygonal upper end of the stock; a lever comprising angularly disposed parts, one of which is journaled for rotation in the upper end of the stock, the other of which is provided with a depending arm; and a spring pawl secured to the arm, and adapted to coöperate with the ratchet.

3. A supplemental handle for a post hole auger, comprising a stock, having a polygonal upper end; a ratchet wheel removably seated upon the polygonal upper end of the stock; a lever comprising a T; a body member secured in one branch of the T; an auxiliary member secured in the opposite branch of the T; an elbow secured to the auxiliary member; a shaft carried by the elbow, at right angles to the auxiliary member, the shaft being received for rotation in the upper end of the stock; an arm carried by the T, at right angles to the body and auxiliary portions of the lever; and a spring pawl secured to the arm, and adapted to coöperate with the ratchet wheel; the elbow being received by the upper end of the stock, to maintain the pawl and the ratchet wheel in operative connection with each other.

In testimony that I claim the foregoing as my own, I have hereto affixed my signature in the presence of two witnesses.

RICHARD WEINREICH.

Witnesses:
WM. MANNING,
F. A. STRICKLER.

Copies of this patent may be obtained for five cents each, by addressing the "Commissioner of Patents, Washington, D. C."